(12) United States Patent
Tessier

(10) Patent No.: US 6,380,901 B1
(45) Date of Patent: Apr. 30, 2002

(54) AUTOMOBILE VEHICLE EQUIPPED WITH AN ANTENNA USED FOR A DEDICATED COMMUNICATION SYSTEM DESCRIPTION

(75) Inventor: Virginie Tessier, Monza, MI (US)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/799,881

(22) Filed: Mar. 7, 2001

(30) Foreign Application Priority Data

Mar. 7, 2000 (FR) .............................. 00 02890

(51) Int. Cl.⁷ .............................. H01Q 1/08; H01Q 1/32
(52) U.S. Cl. ....................... 343/713; 343/711
(58) Field of Search .............................. 343/711, 712, 343/713; 455/86, 90; 342/357, 363; 340/426, 425.5, 559, 825.32, 825.69, 825.72

(56) References Cited

U.S. PATENT DOCUMENTS

| 4,788,550 A | * | 11/1988 | Chadima, Jr. ............... 343/712 |
| 5,278,547 A | * | 1/1994 | Suman et al. ........... 340/825.32 |
| 5,389,920 A | * | 2/1995 | DeLand et al. ........ 340/825.69 |
| 5,628,053 A | * | 5/1997 | Araki et al. ................... 455/86 |
| 5,796,365 A | * | 8/1998 | Lewis ........................ 342/357 |
| 6,218,932 B1 | * | 4/2001 | Stippler ...................... 340/426 |

FOREIGN PATENT DOCUMENTS

EP 0523602 1/1993

* cited by examiner

Primary Examiner—Don Wong
Assistant Examiner—James Clinger
(74) Attorney, Agent, or Firm—Liniak, Berenato, Longacre & White

(57) ABSTRACT

Automobile vehicle fitted with a dedicated communication system provided with an antenna (4) and enabling exchanges of data signals within a communication area corresponding to the antenna radiation area, forming a volume with a chosen shape and dimensions.

Figure 1:
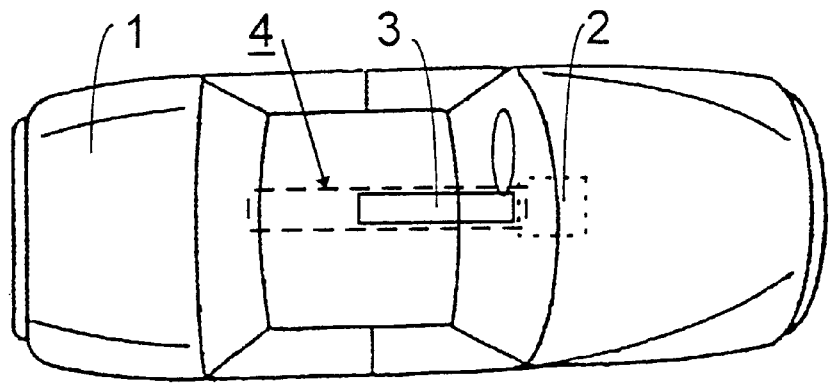

The antenna is an air antenna that forms an elongated loop around a console (3) located on the floor (5) in the automobile vehicle passenger compartment, and that delimits a communication area with a determined shape and extension inside the passenger compartment.

4 Claims, 1 Drawing Sheet

AUTOMOBILE VEHICLE EQUIPPED WITH AN ANTENNA USED FOR A DEDICATED COMMUNICATION SYSTEM DESCRIPTION

The invention relates to an automobile vehicle equipped with a dedicated low frequency communication system provided with an antenna and in particular with a system used for data exchanges between a device called the identifier equipped with identification means installed in the vehicle, and an identification device carried by a user, to activate devices carried on the vehicle.

For example, this type of dedicated communication system may be provided to offer control means under "hands free" conditions. They enable a user to operate devices in the vehicle, for example the engine starter, simply because his presence is detected in the vehicle passenger compartment, provided that the user is carrying or wearing the identifier that is recognized by the identification device. The delimitation of a determined area of this type depends on the antenna through the identifier communicates with the identification device. This identifier usually consists of a transponder that picks up emissions generated by the identifier through the antenna and which replies by signals that the antenna picks up and outputs to the identification device, when the transponder is within the range defined by the antenna. In one known embodiment, the antenna used for a communication system like that described above is a large antenna that forms a loop placed on the vehicle and that is designed to carry a high current and to emit a high energy signal, for example a signal that outputs the energy necessary for the identifier to respond. This loop antenna is made using a length of multi-strand twisted cable, the strands of which are connected end-to-end and strand-by-strand, in order to form turns connected in series. For example, it can be fitted on the frame of an automobile vehicle door, with the length of the cable being installed around the periphery of the door. However, this solution is not fully satisfactory, since the objective is to delimit a communication area inside the passenger compartment and particularly an area running along the longitudinal centerline of the vehicle. Furthermore, in some applications, it is preferable to make it impossible for the identifier to be active when the user is at the side of the vehicle.

Therefore, the purpose of the invention is an automobile vehicle with a passenger compartment and in which there is a longitudinal console on the floor, extending forwards and that is equipped with a dedicated low frequency communication system provided with an antenna and that enables exchanges of data signals within a communication area corresponding to the antenna radiation area, forming a volume with a chosen shape and dimensions.

According to one characteristic of the invention, the system antenna is an air antenna forming an elongated loop around the console, along and at the side of which it extends to form a communication area distributed over at least part of the length of the passenger compartment and inside it.

According to the invention, the loop formed by the system antenna extends along the floor, beyond at least one end of the console, to form a communication area that extends beyond the console, if the console is shorter than the passenger compartment.

According to one variant of the invention, the system antenna extends beyond the front end of the console and continues along the dashboard and/or the instrument panel, inside the passenger compartment to delimit a communication area covering essentially the inside of the passenger compartment and particularly at the front.

Another purpose of the invention is an automobile vehicle in which the antenna, in the form of an elongated loop as defined above, is a "hands free" type communication system antenna enabling data exchanges between a recognition device installed in the vehicle and an identifier device worn or carried by a user for the purposes of actuating devices included in the vehicle.

The invention, and its characteristics and advantages, are described in more detail in the following description with reference to the figures mentioned below.

FIG. 1 shows a diagram of a vehicle on which a communication system with a loop antenna according to the invention is fitted.

Figure 2:
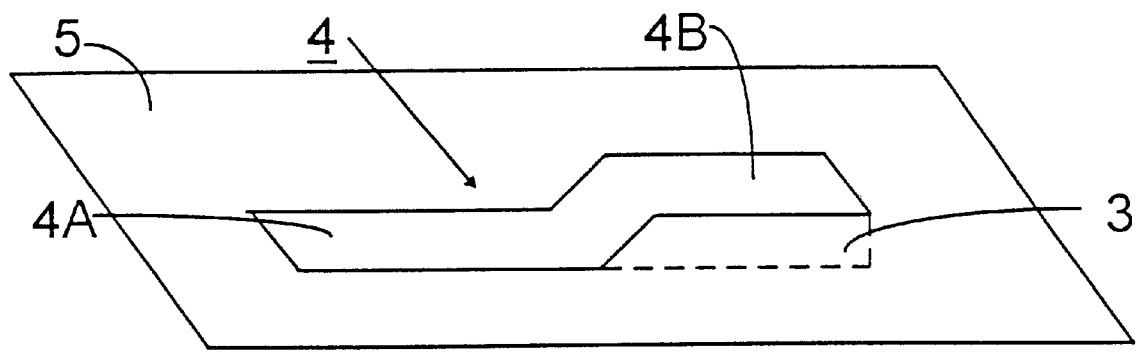

FIG. 2 presents a principle diagram related to a first antenna variant.

Figure 3:
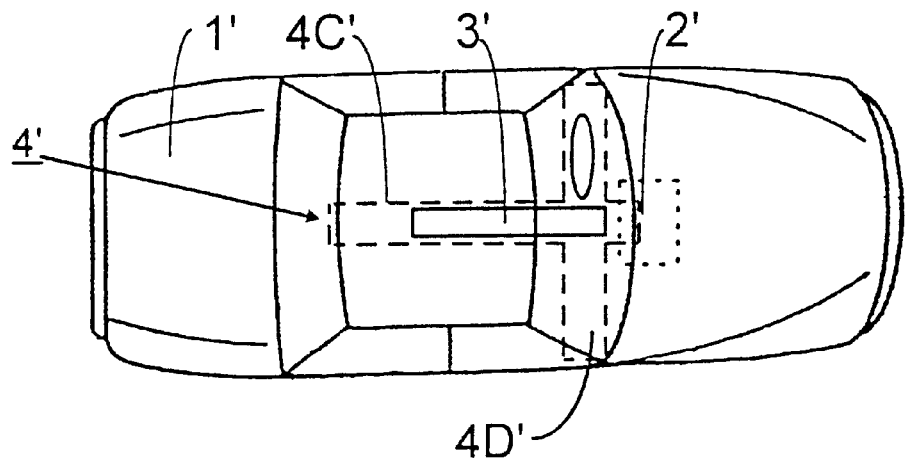

FIG. 3 presents a diagram of a second antenna variant.

The automobile vehicle 1 shown in FIG. 1 is assumed to be equipped with a low frequency dedicated communication system enabling exchanges of data signals between a device 2 installed onboard the vehicle, and a device worn or carried by a user and making it possible for this user to control devices fitted on the vehicle, simply due to the presence of the device that he is carrying or wearing within a communication area defined for the system. In one form of embodiment, the communication system is of the "hands free" type, and for example may be designed to enable the vehicle to be started when a user wearing or carrying a given identification device is within a delimited communication area inside the vehicle passenger compartment.

The identification device, not shown here, may for example be a transponder that receives low frequency electromagnetic signals transmitted to it by a device 2, through an antenna 4 for recognition purposes, and that emits low frequency electromagnetic response signals to this device 2 in order to be recognized. The antenna 4 of device 2 is an air antenna made in the form of a closed loop to give a radiation area with a three-dimensional extent that can be well delimited in its shape and dimensions. This delimitation may be determined in a manner known in itself by action on the loop and the power applied to the loop. The choice of a precise delimitation of the radiation area of antenna 4 is important for this type of application, since it is used to define a communication area inside which a device worn or carried by a user must be located in order to be able to communicate with a device 2. This may be the case in particular if the device worn or carried by the user is an identification device that must only be active when it is inside a predetermined communication area, inside the vehicle, and it is required to control the shape and dimensions of this area.

Therefore, the invention proposes an antenna for a system like that mentioned above for a vehicle with a passenger compartment on the floor on which a there is console 3 in the longitudinal direction extending forwards. As it is known, this type of raised console usually extends between the vehicle front seats as far as under the dashboard at the front of the passenger compartment. It sometimes extends beyond the front seats towards the back of the passenger compartment. This type of console conventionally supports controls and contains storage and/or accessory locations for use by passengers.

According to the invention, the antenna 4 for the system as mentioned above is laid out in a loop around console 3 in the longitudinal direction that extends towards the front of the passenger compartment, for example at the mid-width of the vehicle.

The loop formed by the antenna 4 is elongated and extends along and at the edge of the console 3 as shown in FIG. 1. It may be extended beyond this console 3, particularly towards the back of the vehicle in the passenger compartment, when the length of the console is shorter than the length of the passenger compartment, and for example when the back of the console stops at the front seats in the passenger compartment. This extension of the antenna loop 4 can be made for example on the floor 5 beyond the console 3, as symbolized by the extension 4a in FIG. 2. The remaining part 4B of the loop that surrounds this console is assumed to be at a different level in this case, for example at the top or near the top of the console 3 as shown diagrammatically.

A communication area extends along the length of the passenger compartment inside the vehicle and may thus be obtained, particularly in the case of a vehicle with a long passenger compartment like a monospace.

An extension to the loop may also be formed beyond the front end of the console as shown diagrammatically in FIG. 3, to create a communication area covering most of the inside of the passenger compartment, particularly towards the front. Consequently, the elongated part of the loop 4C' extending along the console 3' continues with a transverse extension, that for example extends along all or part of the dashboard and/or the instrument panel. This is shown diagrammatically in FIG. 3 by the portion of the loop 4D' that extends crosswise across the longitudinal centerline of the console 3' near the front of this console inside the vehicle passenger compartment. The loop 4' thus formed is then connected to a device 2' of the vehicle 1' that corresponds to the device 2 in vehicle 1 shown in FIG. 1. For example, the transverse extension 4D' may be made on each side of the longitudinal centerline of the vehicle. Depending on needs, it may also be limited to the forward central part, or it may only be provided on only one side of the longitudinal centerline of the automobile vehicle passenger compartment.

What is claimed is:

1. An Automobile vehicle with a passenger compartment on the floor (5) of which there is a longitudinal console (3), extending forwards, and that includes a dedicated low frequency communication system provided with an antenna and that enables exchanges of data signals within a communication area corresponding to the antenna radiation area, forming a volume with a chosen shape and dimensions, characterized in that the antenna (4,4') is an antenna forming an elongated loop around the console, along and at the side of which it extends.

2. An automobile vehicle according to claim 1, in which the loop (4B) formed by the antenna (4) of the system extends along the floor in an extension (4A), beyond at least one end of the console (3) to form a communication area that extends beyond the console.

3. A vehicle according to claim 1, in which the antenna (4') of the system extends beyond a front end of the console (3') and continues along at least one of the dashboard and the instrument panel, inside the passenger compartment to delimit a communication area covering essentially the inside of the passenger compartment and particularly at the front.

4. A vehicle according to claim 1, in which the antenna (4 or 4') in the form of said elongated loop is a communication system antenna enabling data exchanges between a recognition device installed in the vehicle and an identification device worn or carried by a user for the purposes of actuating devices installed in the vehicle.

* * * * *